(12) United States Patent
Chiang

(10) Patent No.: US 8,474,587 B2
(45) Date of Patent: Jul. 2, 2013

(54) BICYCLE HUB ASSEMBLY WITH TWO BEARINGS

(75) Inventor: Pi-Yun Chiang, Taichung Hsien (TW)

(73) Assignee: Joy Industrial Co., Ltd., Taichung Hsien (TW)

( * ) Notice: Subject to any disclaimer, the term of this patent is extended or adjusted under 35 U.S.C. 154(b) by 619 days.

(21) Appl. No.: 12/720,143

(22) Filed: Mar. 9, 2010

(65) Prior Publication Data

US 2011/0220449 A1    Sep. 15, 2011

(51) Int. Cl.
*F16D 41/30*    (2006.01)
*B60B 27/04*    (2006.01)

(52) U.S. Cl.
USPC .................. 192/64; 192/110 B; 301/110.5

(58) Field of Classification Search
USPC ................. 192/64, 110 B; 301/110.5
See application file for complete search history.

(56) References Cited

U.S. PATENT DOCUMENTS

| | | | | |
|---|---|---|---|---|
| 5,460,254 A * | 10/1995 | Huang | | 192/64 |
| 6,516,931 B2 * | 2/2003 | Kroger | | 192/46 |
| 6,591,956 B1 * | 7/2003 | Neugent | | 192/64 |
| 6,644,452 B2 * | 11/2003 | Lew et al. | | 192/64 |
| 7,121,394 B2 * | 10/2006 | Chen | | 192/64 |
| 7,484,608 B2 * | 2/2009 | Lew et al. | | 192/64 |
| 7,484,609 B2 * | 2/2009 | Chen | | 192/64 |
| 2003/0011239 A1 * | 1/2003 | Juan | | 301/110.5 |
| 2003/0042100 A1 * | 3/2003 | Juan | | 192/64 |
| 2004/0045783 A1 * | 3/2004 | Lew et al. | | 192/64 |
| 2010/0044180 A1 * | 2/2010 | Chen | | 192/64 |

* cited by examiner

*Primary Examiner* — David D Le
*Assistant Examiner* — Jacob S Scott
(74) *Attorney, Agent, or Firm* — Rosenberg, Klein & Lee

(57) ABSTRACT

A bicycle hub assembly includes a hub having a driving tube connected one end thereof and the driving tube includes a ratchet portion and a sprocket portion respectively defined in an outer periphery thereof. A first recess and a second recess are defined in an inner periphery of the driving tube, wherein the first recess is located corresponding to the ratchet portion and the second recess is located corresponding to the sprocket portion. A ratchet unit is mounted to the ratchet portion and a sprocket unit is mounted to the sprocket portion. A first rotary member and a second rotary member are engaged with the first recess and the second recess respectively.

9 Claims, 6 Drawing Sheets

BICYCLE HUB ASSEMBLY WITH TWO BEARINGS

FIELD OF THE INVENTION

The present invention relates to a driving tube connected to a bicycle hub, and more particularly, to a driving tube including two bearings received therein which allow the ratchet portion and the sprocket portion of the driving tube to rotate smoothly.

BACKGROUND OF THE INVENTION

A conventional bicycle hub generally includes a driving tube connected to one end thereof and an axle extends through the hub and the driving tube. The driving tube includes a ratchet portion and a sprocket portion, and at least one bearing is located between the axle and the hub to let the hub together with the driving tube rotate in one direction to drive the bicycle.

A bicycle hub assembly known to applicant generally includes a hub with a first end and a second end, and an axle extends through the hub. A passive unit is rotatably installed to a chamber in the first end of the hub and rotatable relative to the axle. A passive tube is fixed to the hub and mounted to the axle, multiple pawls are located in the chamber and connected to outside of the passive tube. A spring pushes the pawls. A driving unit is connected to the passive unit and rotatable relative to the passive unit. A driving tube is mounted to the passive tube and includes a ratchet section which is located in the chamber of the hub. A driving section extends from the ratchet section which includes multiple ratchet teeth which push the spring in one direction. The driving section has multiple rectangular teeth.

Another bicycle hub assembly known to applicant generally includes a passive unit which includes a passive frame that is rotatable about an axis. The passive frame includes restriction slots and resistance slots. A clutch unit includes pawls in the restriction slots and each pawl includes a pivotal portion which is pivotably connected to the restriction slot. Each pivotable portion has an engaging portion. The clutch unit further includes a spring which pushes the engaging portion outer from the restriction slot, and multiple resistance members located in the resistance slots. A driving unit includes a ratchet gear which is rotatably connected to the passive frame and the ratchet gear includes driving surface for driving the engaging portion to move the passive frame, and a pressing surface for pushing the engaging portion toward the restriction slots, and tips connected between the driving surface and the pressing surface. The tips contact the resistance members.

The first prior art includes ratchet teeth and the pawls so as to increase the torque of the rectangular teeth so that the first end of the hub does not need any thread to reduce the manufacturing cost. The second prior art provides pawls to drive the ratchet teeth in one direction and each ratchet tooth includes a tip which contacts the resistance member. When the pedal system of the bicycle fails to work, the initial force from the rear wheel makes the resistance member to jump off from the tip so as to let the passive unit to drive the driving unit such that the safety is enhanced.

The bearings that are cooperated with the two prior arts are installed off from the center of rotation of the ratchet unit, so that the ratchet unit tends to bias to one part than another. This increases friction and wastes energy. Besides, when using the bearing that includes beads retained by braces, too many parts are involved and is difficult to maintain.

The present invention intends to provide a bicycle hub assembly wherein the rotary members such as bearings are installed on the center of rotation of the ratchet unit and the sprocket unit so as to reduce the friction and increase smooth of rotation of the hub.

SUMMARY OF THE INVENTION

The present invention relates to a bicycle hub assembly that comprises a hub having a driving tube connected to one of two ends thereof and the driving tube includes a ratchet portion and a sprocket portion respectively defined in an outer periphery thereof. A first recess and a second recess are defined in an inner periphery of the driving tube. The first recess is located corresponding to the ratchet portion and the second recess is located corresponding to the sprocket portion. A ratchet unit mounted to the ratchet portion and rotated with the driving tube, and a sprocket unit is mounted to the sprocket portion and rotated with the driving tube. A rotary unit includes a first rotary member and a second rotary member. Each of the first and second rotary members has an outer portion rotatable relative to an inner portion thereof. The first rotary member is engaged with the first recess and the second rotary member is engaged with the second recess.

The primary object of the present invention is to provide a bicycle hub assembly wherein the two rotary members are located at the center of rotation of the ratchet unit and the sprocket unit, so that the rotation of the ratchet unit and the sprocket unit is smooth with less vibration and friction.

Another object of the present invention is to provide a bicycle hub assembly wherein the positioning of the two rotary members makes the installation and maintenance of the bicycle assembly easy and efficient.

Yet another object of the present invention is to provide a bicycle hub assembly wherein the driving tube integrally forms the corresponding shapes of the rotary unit, the ratchet unit and the sprocket unit, the locking unit securely position the all parts. The installation precision is high and the operation is smooth and reliable.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
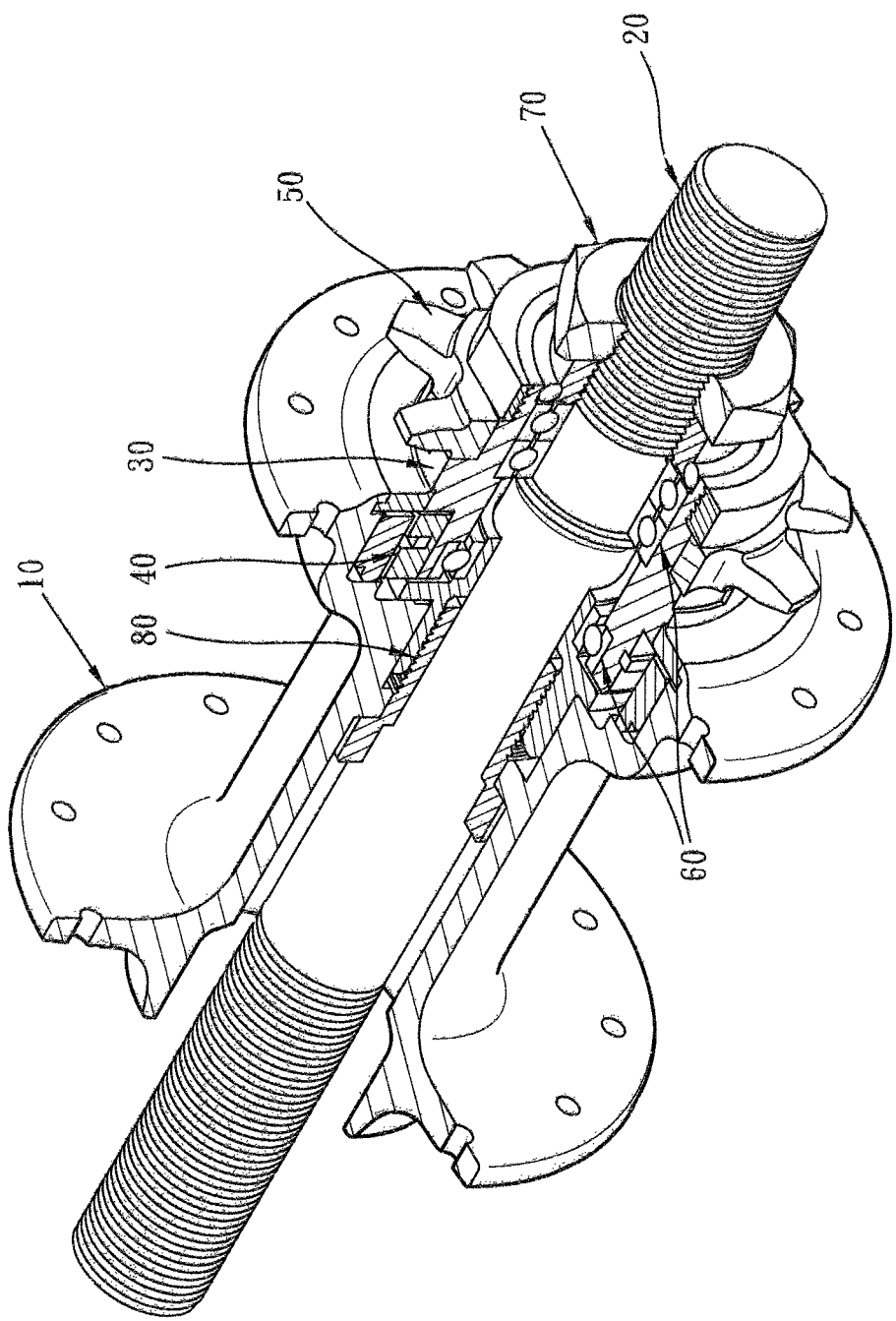
FIG. 1 is a perspective view, partly in cross section, of the hub assembly of the present invention.
Figure 2:
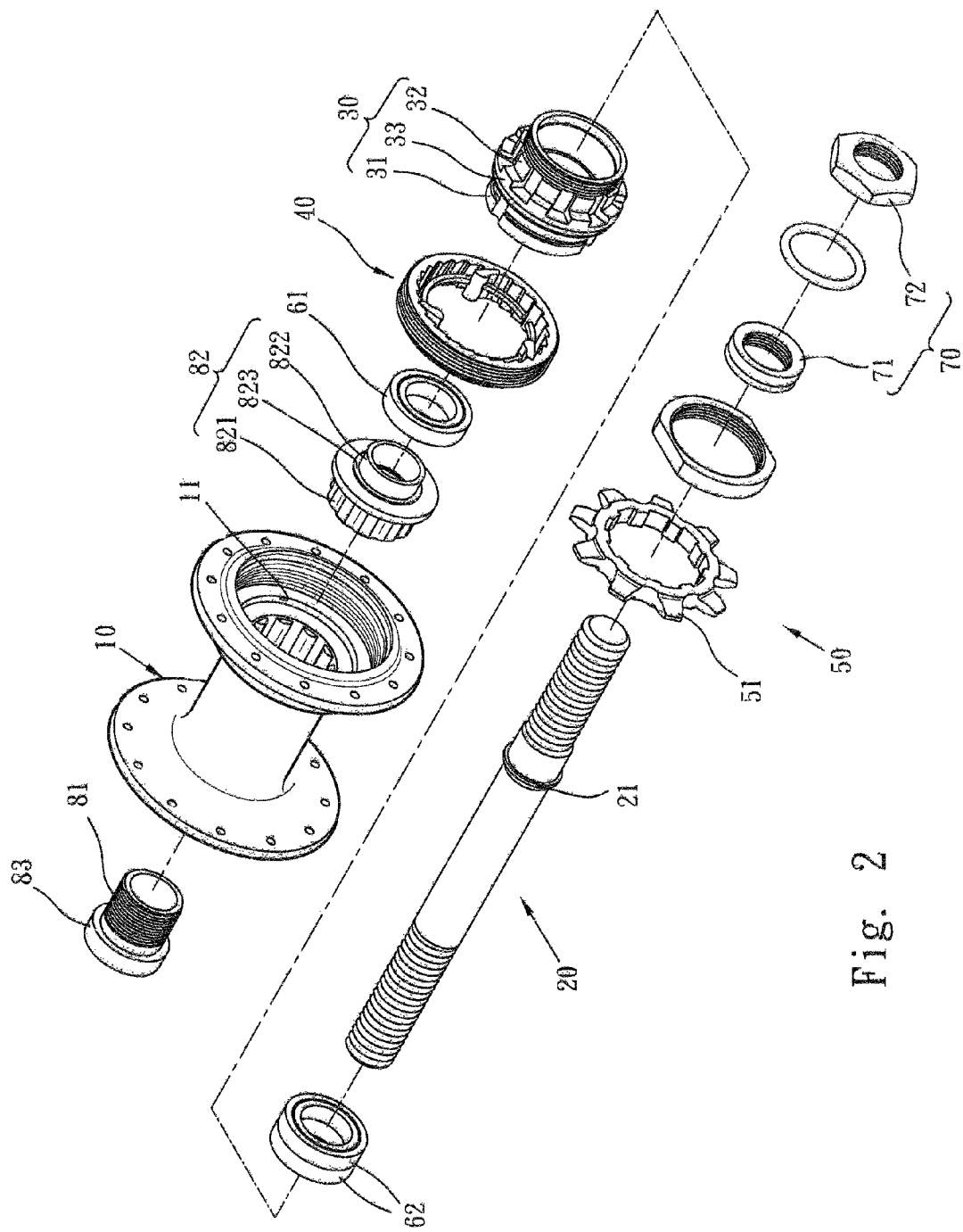
FIG. 2 is an exploded view to show the hub assembly of the present invention.
Figure 3:
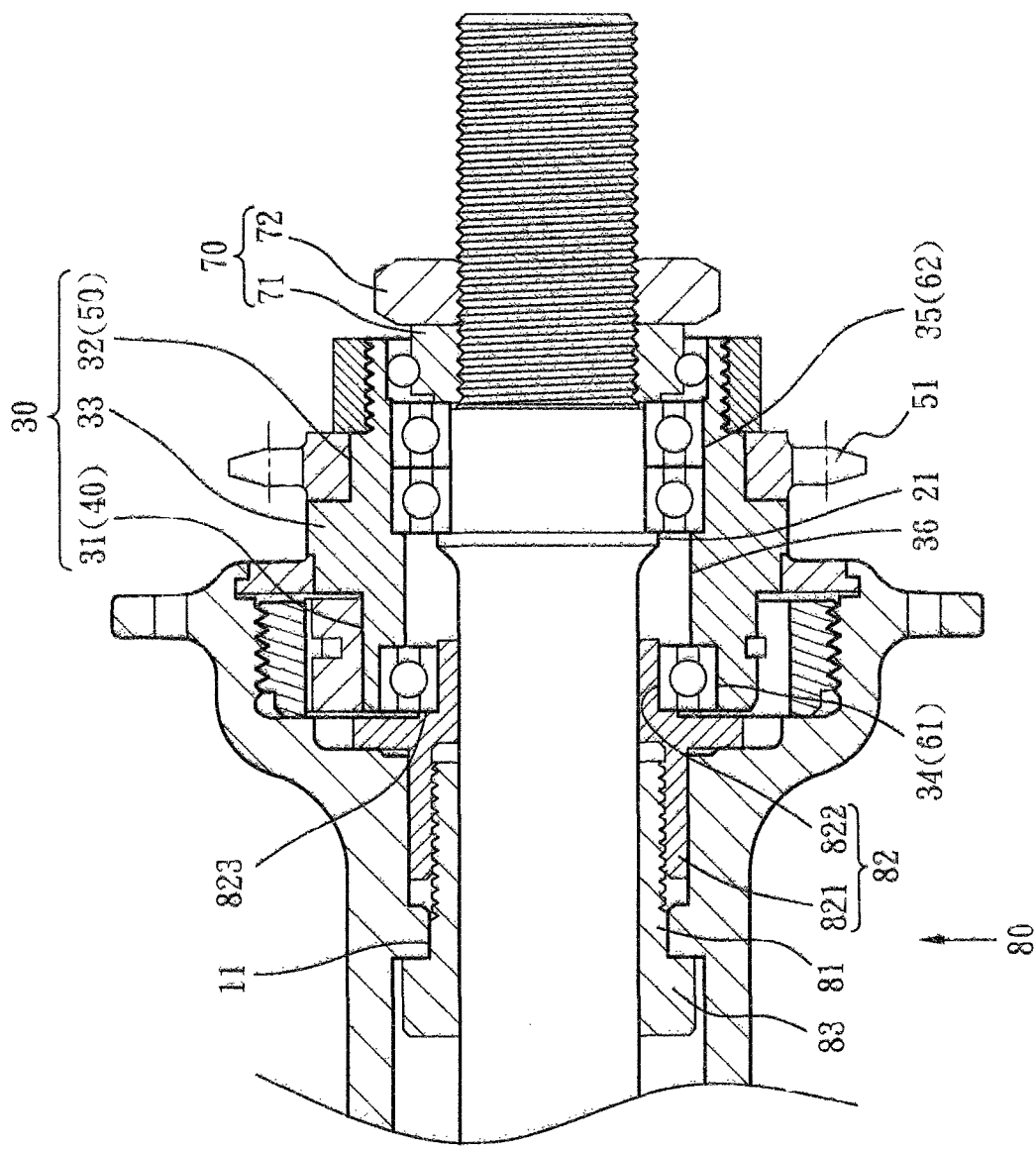
FIG. 3 is an enlarged cross sectional view of the hub assembly of the present invention.

Referring to FIGS. 1 to 3, the bicycle hub assembly of the present invention comprises a hub 10, an axle 20, a driving tube 30, a ratchet unit 40, a sprocket unit 50, a rotary unit 60 and a locking unit 70.

The hub 10 is a hollow tube and includes a positioning flange 11 extending from an inner periphery thereof. The axle 20 extends through the hub 10 and includes a stop flange 21 extending outward from an outer periphery thereof. The driving tube 30 is a hollow tube and connected to one of two ends of the hub 10, A ratchet portion 31 and a sprocket portion 32 are respectively defined in an outer periphery of the driving tube 30. A separation flange 33 is located between the ratchet portion 31 and the sprocket portion 32. A first recess 34 and a second recess 35 are defined in an inner periphery of the driving tube 30. The first recess 34 is located corresponding to the ratchet portion 31 and the second recess 35 is located corresponding to the sprocket portion 32. A protrusion 36 is located between the first and second recesses 34, 35. The two sides of the protrusion 36 contact the outer portions of the first and second rotary members 61, 62 of the rotary unit 60.

The unit 40 is mounted to the ratchet portion 31 and rotated with the driving tube 30. The sprocket unit 50 is mounted to the sprocket portion 32 and rotated with the driving tube 30. The rotary unit 60 includes a first rotary member 61 and a second rotary member 62. Each of the first and second rotary members 61, 62 has an outer portion rotatable relative to an inner portion thereof. The first rotary member 61 is engaged with the first recess 34 and the second rotary member 62 is engaged with the second recess 35. The axle 20 extends through the hub 10, the first rotary member 61 and the second rotary member 62.

The locking unit 70 is mounted to the axle 20 and includes a locking ring and a locking nut 72. The locking ring 71 has one side contacting a side of the inner portion of the second rotary member 62 and the locking nut 72 is threadedly connected to the axle 20 to press the locking ring 71 toward the second rotary member 62.

The positioning unit 80 is located between the hub 10 and the axle 20. The positioning unit 80 extends through the first rotary member 61. In detail, the positioning unit 80 includes a first positioning part 81 and a second positioning part 82. The first positioning part 81 is inserted into the first end of the hub 10 and includes an end flange 83 which contacts the positioning flange 11. The second positioning part 82 includes an insertion end 821 and a connection end 822. The insertion end 821 is inserted into a second end of the hub 10 and threadedly connected with the first positioning part 81. The connection end 822 is engaged with the inner periphery of the first rotary part 61. The connection end 822 of the second positioning part 82 includes a stepped portion 823 which is in contact with a side of the inner portion of the first rotary part 61.

The first and second rotary members 61, 62 are respectively located at the center of the rotation of the ratchet unit 40 and the sprocket unit 50. The first and second rotary members 61, 62 are easily installed to pre-set positions and enhance the rotation of the hub assembly which simplify the installation and maintenance of the hub assembly.

When assembling the hub assembly, the first and second rotary members 61, 62 are first installed in the first and second recesses 34, 35, and the ratchet unit 40 is mounted to the ratchet portion 31 on the driving tube 30. The first and second positioning parts 81, 82 are then inserted into two ends of the hub 10, the insertion end 821 is threadedly connected to the first positioning part 81 and the end flange 83 of the first positioning part 81 is in contact with the positioning flange 11. The axle 20 extends through the first and second positioning parts 81, 82 and the first rotary member 61 is mounted to the connection end 822. The inner portion of the first rotary member 61 contacts the stepped portion 823 and the inner portion of the second rotary member 62 contacts the stop flange 21. The sprocket unit 50 is then mounted to the sprocket portion 32. The locking ring 71 and the locking nut 72 threadedly connected to the axle 20 to let the locking ring 71 urge the second rotary member 62 to finish the assembly steps.

The first rotary member 61 is located at the center of rotation of the ratchet unit 40 and the second rotary member 62 is located at the center of rotation of the sprocket unit 50. By this arrangement, the rotations of the ratchet unit 40 and the sprocket unit 50 are smooth and do not affect other parts. The inner portion and the outer portion of the first rotary member 61 are in contact with the stepped portion 823 and the protrusion 36, and the inner portion and the outer portion of the second rotary member 62 are in contact with the stop flange 21 and the locking ring 71 and the protrusion 36. Therefore, the operation of the whole hub assembly is stable and smooth. Besides, the first and second rotary members 61, 62, the ratchet unit 40 and the sprocket unit 50 are mounted to the driving tube 20, the installation precision can be easily controlled and achieved.

The driving tube 20 integrally includes the first and second recesses 34, 35, the ratchet portion 31 and the sprocket portion 32 so that the number of parts and the manufacturing cost can be reduced.

Figure 4:
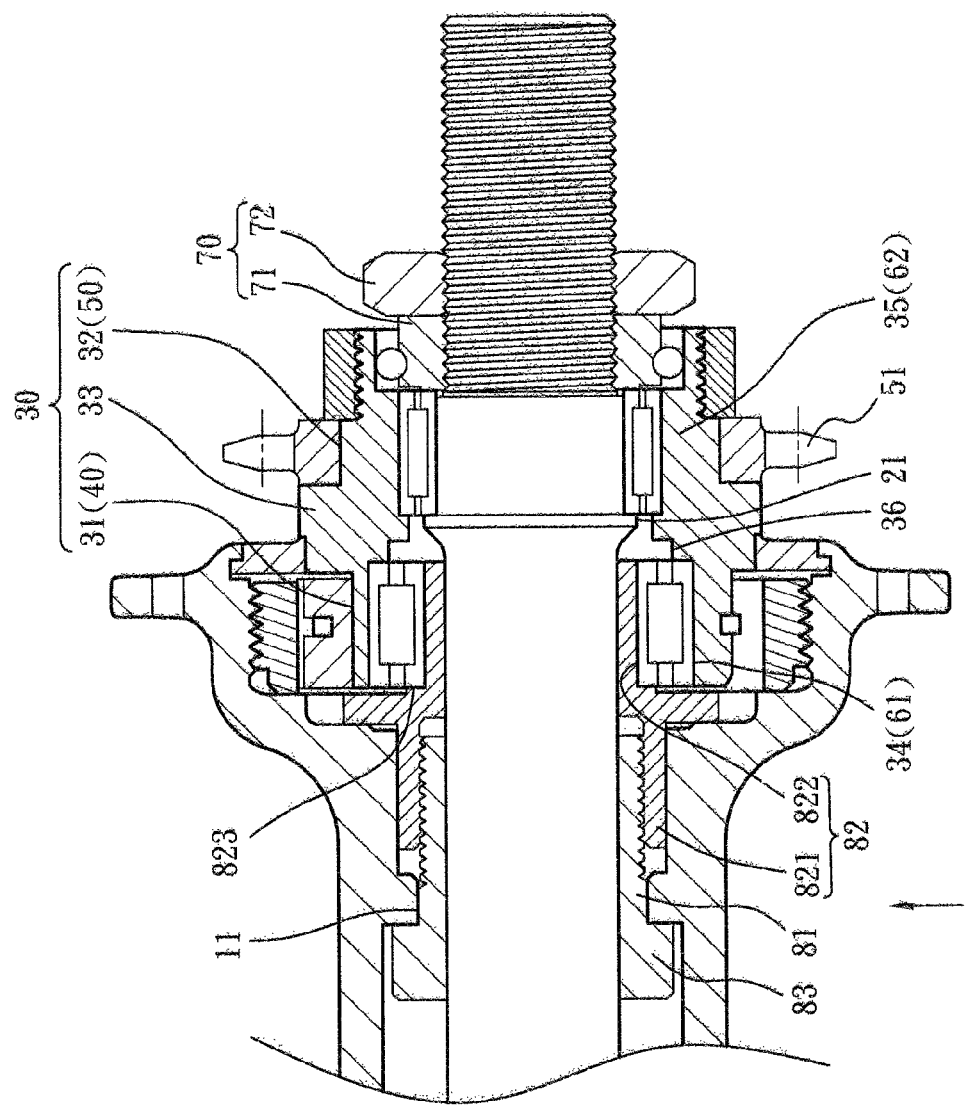
FIG. 4 is another enlarged cross sectional view of the hub assembly of the present invention using, different rotary members.

FIG. 4 shows that the first and second rotary members 61, 62 each have an inner portion and an outer portion, between which multiple cylindrical rollers are received. The first and second rotary members 61, 62 perform the same function as disclosed in FIGS. 1-3.

Figure 5:
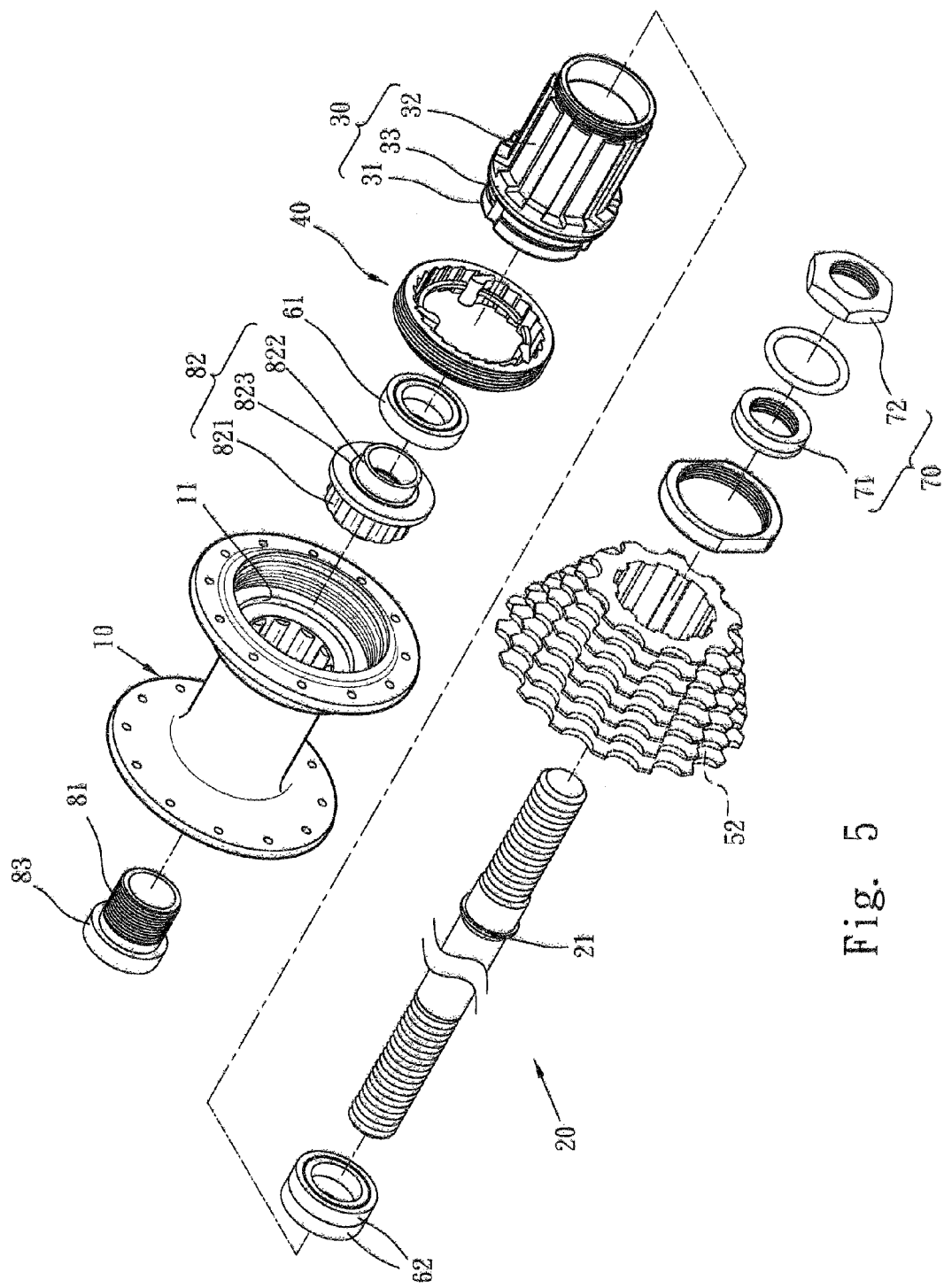
FIG. 5 is an exploded view to show the hub assembly of the present invention with the cluster of sprockets.
Figure 6:
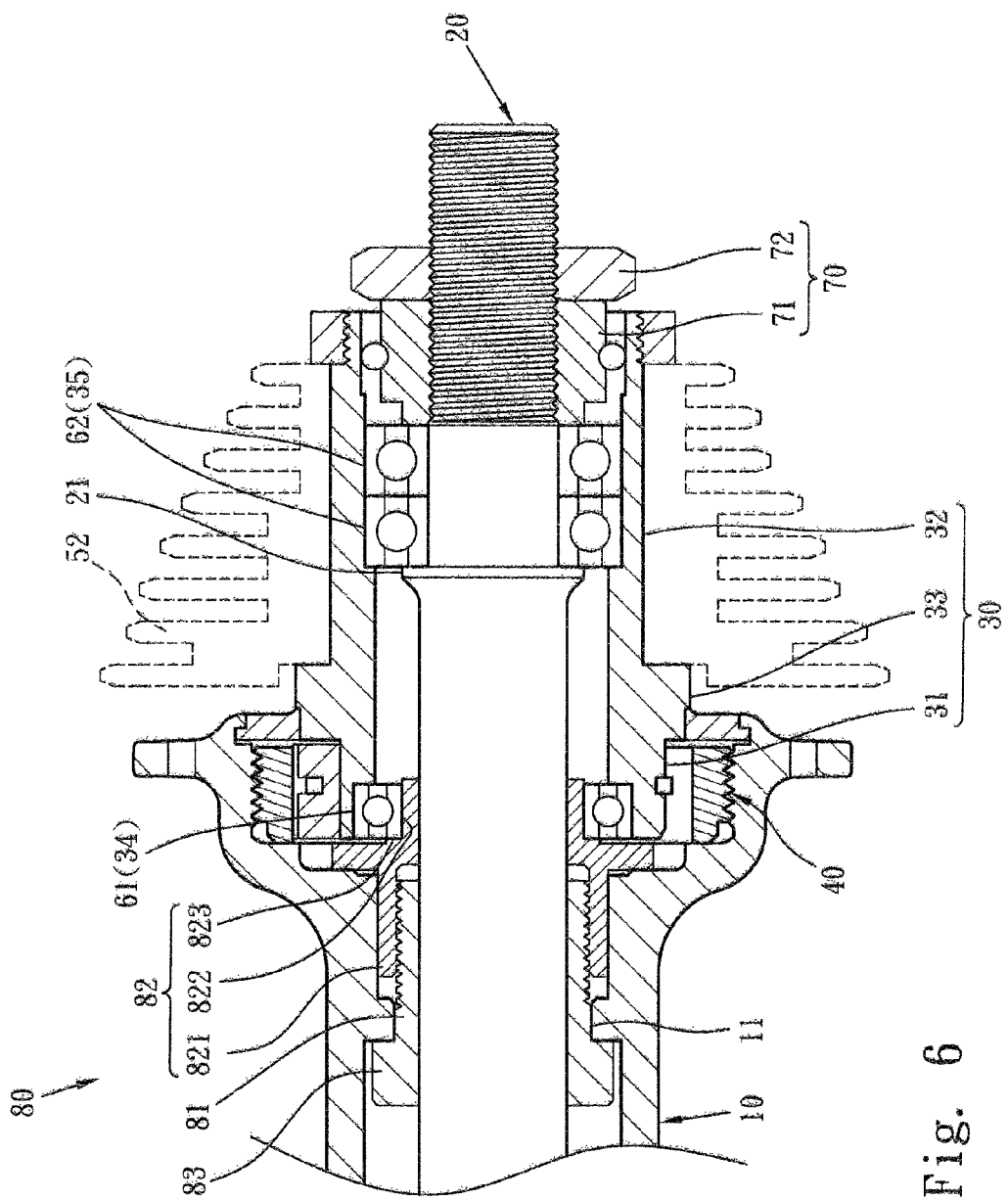
FIG. 6 is an exploded view to show the hub assembly of the present invention disclosed in FIG. 5.

FIGS. 5 and 6 show that the sprocket unit 50 is a cluster of sprockets 52 which are overlapped to each other and mounted to the sprocket portion 32. The provides multiple gears of speed.

While we have shown and described the embodiment in accordance with the present invention, it should be clear to those skilled in the art that further embodiments may be made without departing from the scope of the present invention.

What is claimed is:

1. A bicycle hub assembly comprising:
a hub having a driving tube connected to one of two ends of the hub and the driving tube being a hollow tube, a ratchet portion and a sprocket portion respectively defined on an outer periphery of the driving tube, a first recess and a second recess defined in an inner periphery of the driving tube, the first recess located corresponding to the ratchet portion and the second recess located corresponding to the sprocket portion;
a ratchet unit mounted to the ratchet portion and rotated with the driving tube;
a sprocket unit mounted to the sprocket portion and rotated with the driving tube,
a rotary unit including a first rotary member and a second rotary member, each of the first and second rotary members having an outer portion rotatable relative to an inner portion thereof, the first rotary member engaged with the first recess and the second rotary member engaged with the second recess;
an axle extending through the hub and the second rotary member, a positioning unit being located between the hub and the axle, the positioning unit extending through the first rotary member; and
a positioning flange extending from an inner periphery of the hub, the positioning unit including a first positioning part and a second positioning part, the first positioning part being inserted into a first end of the hub and including an end flange which contacts the positioning flange, the second positioning part including an insertion end and a connection end, the insertion end being inserted into a second end of the hub and threadedly connected with the first positioning part, the connection end being engaged with the inner periphery of the first rotary part.

2. The assembly device as claimed in claim 1, wherein a protrusion is located between the first and second recesses.

3. The assembly as claimed in claim 1, wherein a separation flange is located between the ratchet portion and the sprocket portion.

4. The assembly as claimed in claim 1, wherein the connection end of the second positioning part includes a stepped portion which is in contact with a side of the inner portion of the first rotary part.

5. The assembly as claimed in claim 1, wherein the axle includes a stop flange extending outward from an outer periphery thereof and the inner portion of the second rotary part contacts the stop flange.

6. The assembly as claimed in claim 1, wherein the sprocket unit includes a single sprocket which is mounted to the sprocket portion.

7. The assembly as claimed in claim 1, wherein the sprocket unit includes a cluster of sprockets which is mounted to the sprocket portion.

8. The assembly as claimed in claim 1, wherein a locking unit is mounted to the axle and includes a locking ring and a locking nut, the locking ring has one side contacting a side of the inner portion of the second rotary member and the locking nut is threadedly connected to the axle to press the locking ring toward the second rotary member.

9. The assembly as claimed in claim 1, wherein each of the first and second rotary members has rollers located between the outer portion and the inner portion thereof.

\* \* \* \* \*